US012094631B2

(12) United States Patent
Cheng et al.

(10) Patent No.: US 12,094,631 B2
(45) Date of Patent: Sep. 17, 2024

(54) CHIP INDUCTOR AND METHOD FOR MANUFACTURING SAME

(71) Applicant: ANHUI ANUKI TECHNOLOGIES CO., LTD., Anhui (CN)

(72) Inventors: Wei Cheng, Anhui (CN); Chengjie Zuo, Anhui (CN); Jun He, Anhui (CN)

(73) Assignee: ANHUI ANUKI TECHNOLOGIES CO., LTD., Anhui (CN)

(*) Notice: Subject to any disclaimer, the term of this patent is extended or adjusted under 35 U.S.C. 154(b) by 746 days.

(21) Appl. No.: 17/261,787

(22) PCT Filed: Feb. 22, 2019

(86) PCT No.: PCT/CN2019/075804

§ 371 (c)(1),
(2) Date: Jan. 20, 2021

(87) PCT Pub. No.: WO2020/077928

PCT Pub. Date: Apr. 23, 2020

(65) Prior Publication Data

US 2021/0257141 A1    Aug. 19, 2021

(30) Foreign Application Priority Data

Oct. 17, 2018 (CN) ......................... 201811209431.3
Oct. 17, 2018 (CN) ......................... 201821686823.4

(51) Int. Cl.
*H01F 7/06* (2006.01)
*H01F 5/00* (2006.01)
*H01F 17/00* (2006.01)

(52) U.S. Cl.
CPC ......... *H01F 17/0013* (2013.01); *H01F 5/003* (2013.01)

(58) Field of Classification Search
CPC .... H01F 27/292; H01F 5/003; H01F 17/0013; H01F 41/042
See application file for complete search history.

(56) References Cited

U.S. PATENT DOCUMENTS 6,293,001 B1 * 9/2001 Uriu ...................... H01F 41/041
336/200
7,355,270 B2 4/2008 Hasebe et al.
(Continued)

FOREIGN PATENT DOCUMENTS

CN 1635637 7/2005
CN 101106129 1/2008
(Continued)

OTHER PUBLICATIONS

International Search Report, PCT/CN2019/075804, mailed Jul. 9, 2019.

*Primary Examiner* — Paul D Kim
(74) *Attorney, Agent, or Firm* — Greenberg Traurig

(57) ABSTRACT

Provided is a chip inductor and manufacturing method thereof. The chip inductor includes: a pin layer, a plurality of insulating layers and a plurality of metal layers, where the insulating layers and the metal layers are arranged successively and alternately on the pin layer. Multiple patterned metal structures arranged in the plurality of metal layers are respectively electrically connected to form a multilayer plane spiral coil structure. The multilayer plane spiral coil structure has two ends electrically connected with respective pin structures in the pin layer.

9 Claims, 3 Drawing Sheets

(56) References Cited

U.S. PATENT DOCUMENTS

| | | | | |
|---|---|---|---|---|
| 9,396,874 | B2 * | 7/2016 | Nakamura | H01F 41/04 |
| 2005/0174208 | A1 | 8/2005 | Sato et al. | |
| 2011/0133879 | A1 | 6/2011 | Chiu et al. | |
| 2014/0176283 | A1 | 6/2014 | Yang et al. | |
| 2015/0040382 | A1 | 2/2015 | Wi et al. | |
| 2016/0079165 | A1 | 3/2016 | Mei et al. | |

FOREIGN PATENT DOCUMENTS

| | | |
|---|---|---|
| CN | 101477873 | 7/2009 |
| CN | 101840768 | 9/2010 |
| CN | 102522181 | 6/2012 |
| CN | 103268873 | 8/2013 |
| CN | 104538383 | 4/2015 |
| CN | 106129047 | 11/2016 |
| CN | 106298180 | 1/2017 |
| CN | 107039395 | 8/2017 |
| CN | 107492437 | 12/2017 |
| CN | 108346642 | 7/2018 |
| CN | 109215979 | 1/2019 |
| CN | 208834878 | 5/2019 |
| JP | 2009266908 | 11/2009 |
| JP | 2017216428 | 12/2017 |

* cited by examiner

CHIP INDUCTOR AND METHOD FOR MANUFACTURING SAME

CROSS-REFERENCE TO RELATED APPLICATIONS

The present application is a National Stage Application under 35 U.S.C. 371 of International Patent Application No. PCT/CN2019/075804, filed on Feb. 22, 2019, which claims priority to Chinese patent applications No. 201811209431.3 and No. 201821686823.4 filed on Oct. 17, 2018, the disclosures of which are incorporated herein by reference in their entireties.

TECHNICAL FIELD

The present disclosure relates to a technical field of electronic components and, for example, a chip inductor and manufacturing method thereof.

BACKGROUND

With an increasing demand of users for miniaturization of electronic products, integration level of electronic products has been gradually increased, which leads to higher requirements for the size of electronic components contained in the electronic products. The compromise of miniaturization and electrical performance of electronic components has become an urgent problem to be solved.

Chip inductors are widely used in various electronic products, the size and electrical performance of chip inductors directly affect the size and performance of electronic products integrated with the chip inductors, which also makes it crucial for the chip inductors to take both miniaturization and electrical performance of the chip inductors into account.

SUMMARY

In view of this, the present disclosure provides a chip inductor and manufacturing method thereof, which is beneficial to obtaining a large inductance value within a small size, that is, to realizing miniaturization of the chip inductor; meanwhile the chip inductor may be manufactured using a semiconductor process, which is beneficial to accurately controlling size of the chip inductor, improving precision of the chip inductor, increasing conductivity of the chip inductor, reducing resistance of the chip inductor and improving Q value (quality factor) of the chip inductor.

In a first aspect, a chip inductor is provided according to an embodiment of the present disclosure, including: a pin layer, multiple insulating layers and multiple metal layers. The multiple insulating layers and the multiple metal layers are arranged successively and alternately on the pin layer. Multiple patterned metal structures respectively arranged in the multiple metal layers are electrically connected to form a multilayer plane spiral coil structure. Any two adjacent patterned metal structures of the multiple patterned metal structures are electrically connected through a via structure in one insulating layer between the two adjacent patterned metal structures of the multiple insulating layers.

The multilayer plane spiral coil structure has two ends electrically connected with respective pin structures in the pin layer.

In an embodiment, the multilayer plane spiral coil structure includes multiple monolayer plane spiral coil structures along an axial direction of the multiplayer plane spiral coil structure, and a dielectric structure between two adjacent monolayer plane spiral coil structures of multiple monolayer plane spiral coil structures has a thickness greater than a thickness of each of the monolayer plane spiral coil.

In an embodiment, the dielectric structure is formed of a material including polyimide (PI).

In an embodiment, the multilayer plane spiral coil structure has an axial direction perpendicular to or parallel with a plane of the pin layer.

In an embodiment, the multilayer plane spiral coil structure includes multiple monolayer plane spiral coil structures along an axial direction of the multilayer plane spiral coil structure, and each of multiple monolayer plane spiral coil structures forms a coil structure with at least one turn.

In an embodiment, each pin structure includes a pad structure and metal structure located on the pad structure, and the two ends of the multilayer plane spiral coil structure are electrically connected with respective metal structures.

In a second aspect, a manufacturing method of a chip inductor is provided according to an embodiment of the present disclosure, used for manufacturing the chip inductor according to the first aspect.

The manufacturing method includes: a substrate is formed; a first patterned metal structure on the substrate is formed; a first insulating layer is formed on the first patterned metal structure and a via structure is formed at a set position of the first insulating layer; a second patterned metal structure is formed on the first insulating layer, where the second patterned metal structure is electrically connected to the first patterned metal structure through the via structure located in the first insulating layer; insulating layers and patterned metal structures are alternately formed on the second patterned metal structure, until an N-th insulating layer is formed, where N is an integer greater than 1, an M-th patterned metal structure is electrically connected with an (M−1)-th patterned metal structure through a via structure located in M−1-th insulating layer, M is an integer greater than 2 and less than or equal to N; a pin structure is formed on the N-th insulating layer; at last the substrate is removed or ground.

In an embodiment, an M1-th patterned metal structure is formed through one of an electroplating process, a sputtering process or an etching process; where M1 is a positive integer and less than or equal to N.

In an embodiment, an M2-th insulating layer is formed of a material including polyimide (PI), and a via structure is formed at the set position of the M2-th insulating layer through at one of a dry etching process or a laser etching process; where M2 is a positive integer and less than or equal to N.

A chip inductor is provided according to an embodiment of the present disclosure. The chip inductor includes a pin layer, multiple insulating layers and multiple metal layers, where the multiple insulating layers and the multiple metal layers are arranged alternately on the pin layer, multiple patterned metal structures arranged in the multiple metal layers are electrically connected to form a multilayer plane spiral coil structure; the multilayer plane spiral coil structure has two ends electrically connected with respective pin structures in the pin layer. The multiple insulating layers and metal layers are arranged alternately in the chip inductor, and the multiple patterned metal structures arranged in the multiple metal layers form the multilayer plane spiral coil structure, which is beneficial to obtaining a large inductance value within a small size, that is, to realizing miniaturization of the chip inductor; meanwhile the chip inductor may be manufactured using a semiconductor process, which is beneficial to accurately controlling size of the chip inductor, improving precision of the chip inductor precision and increasing conductivity of the chip inductor, reducing resistance of the chip inductor and improving Q value of the chip inductor.

DETAILED DESCRIPTION

Figure 1:
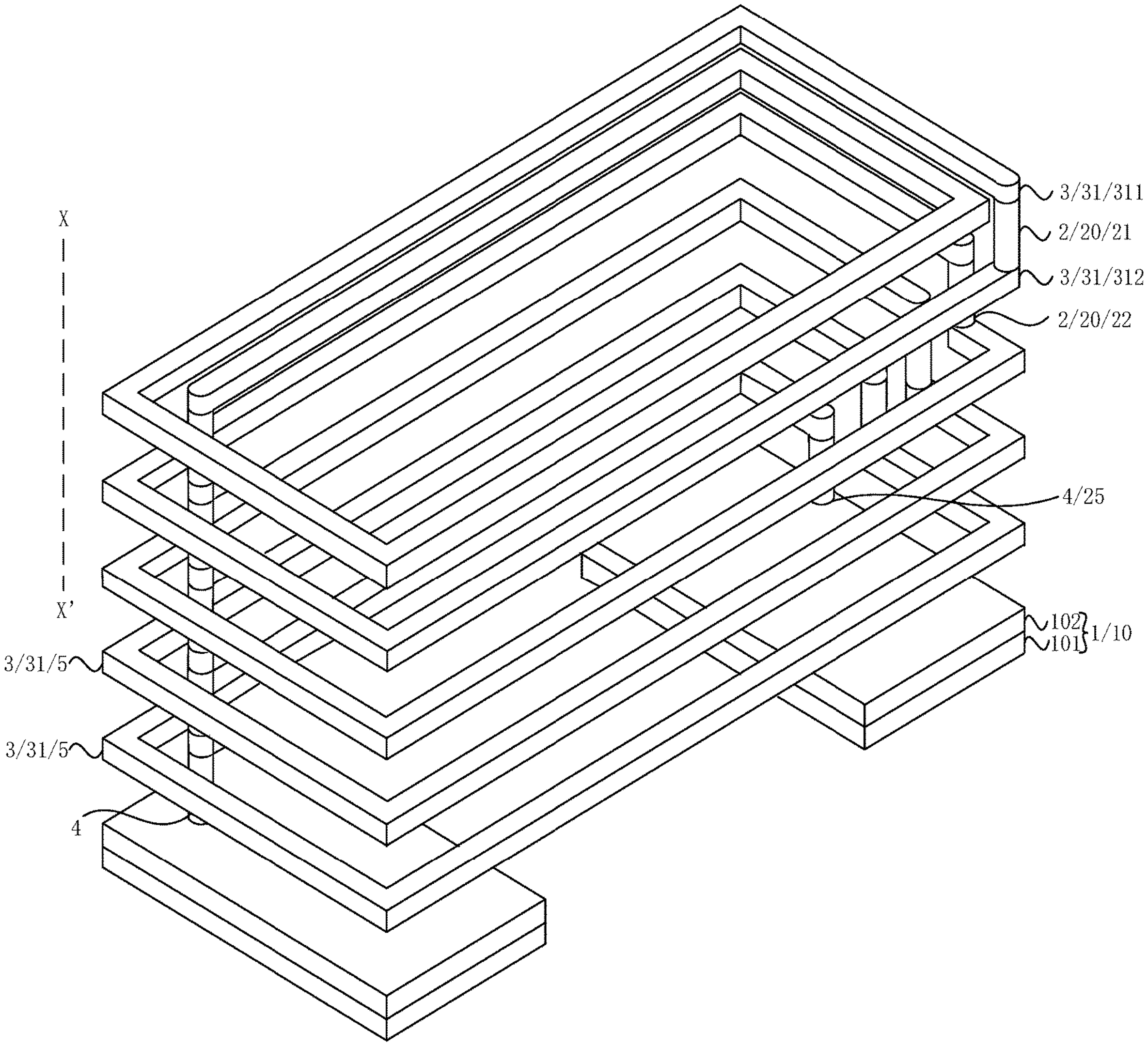
FIG. 1 is a structural diagram of a chip inductor according to an embodiment of the present disclosure.

The present disclosure will be further described in detail with reference to the accompanying drawings and embodiments. It is to be understood that the embodiments set forth below are intended to illustrate and not to limit the present disclosure. Additionally, it is to be noted that to facilitate description, only part, not all, of structures related to the present disclosure are illustrated in the accompanying drawings. In this specification, a same or similar reference numeral refers to a same or similar structure, element or process. It should be noted that the embodiments in this disclosure and the features in the embodiments may be combined with each other without conflict.

The embodiments of this disclosure provide a chip inductor including a pin layer, insulating layers and metal layers. The insulating layers and the metal layers are arranged successively and alternately on the pin layer. Multiple patterned metal structures arranged in the metal layers are respectively electrically connected to form a multilayer plane spiral coil structure. Any two adjacent patterned metal structures are electrically connected through a via structure in one insulating layer between the two adjacent patterned metal structures of the insulating layers. The multilayer plane spiral coil structure has two ends electrically connected with respective pin structures in the pin layer.

With an increasing demand of users for miniaturization of electronic products, electronic products have a gradually increased integration level, which leads to higher requirements for the size of electronic components contained in the electronic products. The compromise of miniaturization and electrical performance of electronic components has become an urgent problem to be solved. Chip inductors are widely used in various electronic products, the size and electrical performance of chip inductors directly affect the size and performance of electronic products integrated with the chip inductors, which also makes it crucial for the chip inductors to take both miniaturization and electrical performance of the chip inductors into account.

The chip inductor according to the present disclosure includes a pin layer, insulating layers and metal layers. The insulating layers and the metal layers are arranged on the pin layer. Multiple patterned metal structures respectively arranged in the metal layers are electrically connected to form a multilayer plane spiral coil structure. The multilayer plane spiral coil structure has two ends electrically connected with respective pin structures in the pin layer. In this way, the insulating layers and the metal layers are arranged alternately on the pin layer, and the patterned metal structures arranged in the metal layers form a multilayer plane spiral coil structure to obtain a large inductance value within a small size, which is advantageous for miniaturization of the chip inductor, meanwhile the chip inductor may be manufactured using a semiconductor process, which is beneficial to accurately controlling size of the chip inductor, improving precision of the chip inductor, increasing conductivity of the chip inductor, reducing resistance of the chip inductor and improving Q value of the chip inductor.

The present disclosure will be further described in detail with reference to the accompanying drawings and embodiments. Based on the present disclosure, all other embodiments obtained by those skilled in the art without creative work are within the protection scope of the present disclosure.

FIG. 1 is a structural diagram of a chip inductor according to an embodiment of the present disclosure. As shown in FIG. 1, a chip inductor includes a pin layer 1, insulating layers 2 and metal layers 3. The insulating layers 2 and the metal layers 3 are alternately arranged on the pin layer 1. Multiple patterned metal structures 31 respectively arranged in the metal layers 3 are electrically connected to form a multilayer plane spiral coil structure. Any two adjacent patterned metal structures 31 are electrically connected through a via structure 20 in one insulating layer 2 between the two adjacent patterned metal structures 31 of the insulating layers 3. The multilayer plane spiral coil structure has two ends 4 electrically connected with respective pin structures 10 in the pin layer 1. In FIG. 1, five metal layers 3 are arranged above the pin layer 1 as an example. The present disclosure has no limitation for the specific number of the metal layers 3 above the pin layer 1.

An insulating layer 2 is arranged between every two adjacent metal layers 3 along a direction perpendicular to the pin layer 1 to realize electrical insulation of the multilayer patterned metal structure 31 in the adjacent metal layers 3 without an electrical connection. An insulating layer 2 is also arranged between lowermost metal layer 3 and the pin layer 1 to achieve electrical insulation of the part without an electrical connection between the lowermost metal layer 3 and the pin layer 1. In FIG. 1, only the via structure 20 in each of the insulating layers 2 is shown, the two ends 4 of the multilayer plane spiral coil structure are electrically connected with corresponding pin structures 10 in the pin layer 1 through the via structure 20 located in the corresponding insulating layer 2.

Figure 2:
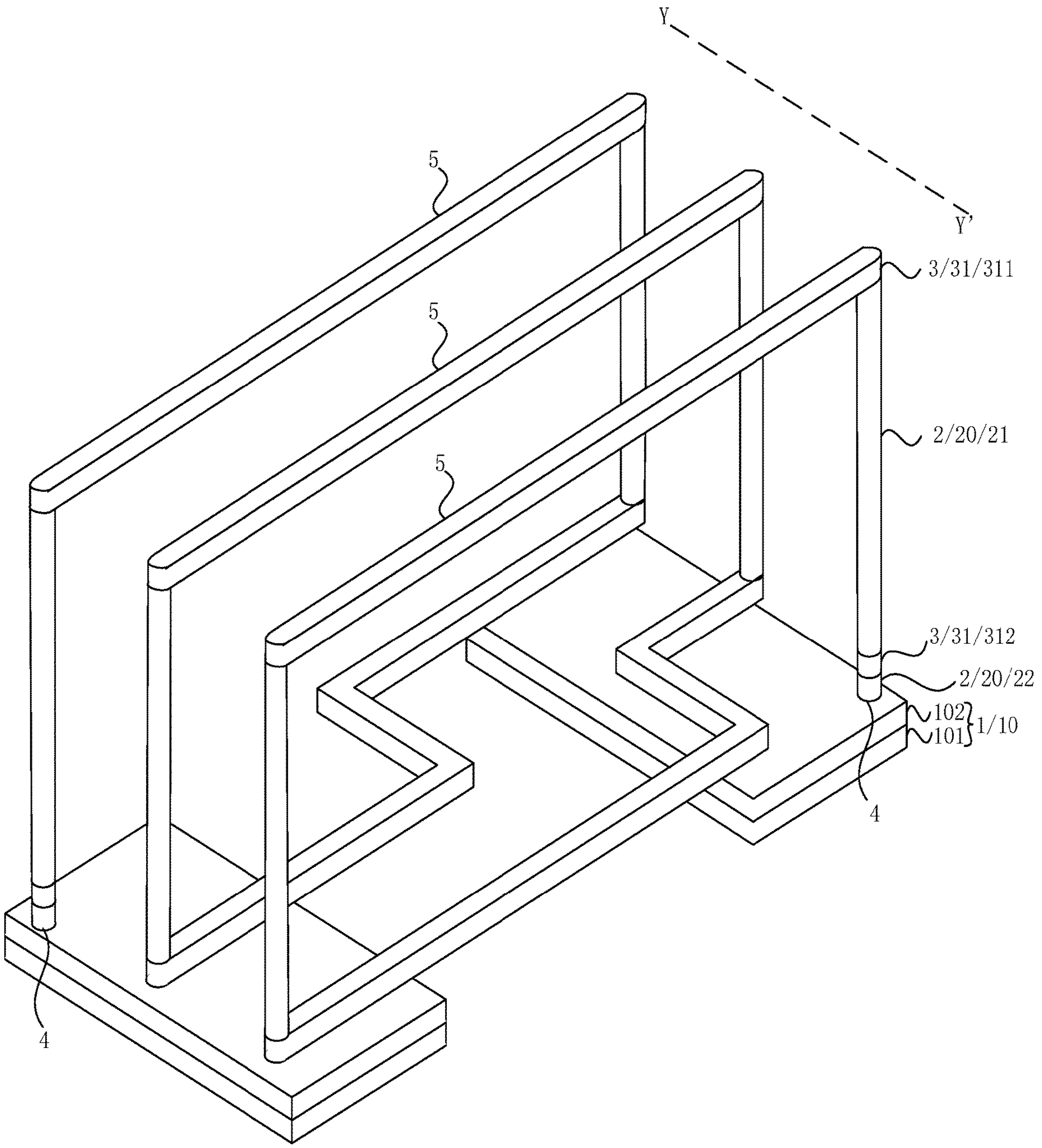
FIG. 2 is a structural diagram of another chip inductor according to an embodiment of the present disclosure.

FIG. 2 is a structural diagram of another chip inductor according to an embodiment of the present disclosure. Different from the chip inductor structure shown in FIG. 1, an axial direction XX of the multilayer planar spiral coil structure formed by the chip inductor structure shown in FIG. 1 is perpendicular to a plane of the pin layer 1, and an axial direction YY' of the multilayer planar spiral coil structure formed by the chip inductor structure shown in FIG. 2 is parallel with the plane of pin layer 1. Exemplarily in FIG. 2 two metal layers 3 are arranged above the pin layer 1, and an insulating layer 2 is arranged between each two metal layers 3 to realize electrical insulation of the patterned metal structures 31 in the two metal layers 3 without an electrical connection. Similarly, an insulating layer 2 is also arranged between the lowermost metal layer 3 and the pin layer 1 to achieve electrical insulation of the part without an electrical connection between the lowermost metal layer 3 and the pin layer 1. In FIG. 2 only the via structure 20 in each of the insulating layers 2 is shown, the two ends 4 of the multilayer plane spiral coil structure are electrically connected with corresponding pin structures 10 in the pin layer 1 through the via structure 20 located in the corresponding insulating layer 2.

A commonly used chip inductor is a multilayer co-fired ceramic (MLCC) using a ceramic material with a low conductivity, and its rough manufacturing process makes the chip inductor with a low Q value, which is unable to accurately control the size of the chip inductor. Because of a low precision, it is difficult to realize miniaturize the chip inductor. The multiple insulating layers 2 and metal layers 3 are arranged alternately in the chip inductor according to the present disclosure, and the multiple patterned metal structures 31 arranged in the multiple metal layers 3 form the multilayer plane spiral coil structure, which is beneficial to obtaining a large inductance value within a small size, that is, to realizing miniaturization of the chip inductor; meanwhile the chip inductor may be manufactured using a semiconductor process, which is beneficial to accurately controlling size of the chip inductor, improving precision of the chip inductor, increasing conductivity of the chip inductor, reducing resistance of the chip inductor and improving Q value of the chip inductor.

In an embodiment, the multilayer plane spiral coil structure includes monolayer plane spiral coil structures 5 along an axial direction of the multiplayer plane spiral coil structure, and a dielectric structure between two adjacent monolayer plane spiral coil structures of the monolayer plane spiral coil structures 5 has a thickness greater than a thickness of each of the monolayer plane spiral coil structures 5. As shown in FIG. 1, an axial direction of the monolayer plane spiral coil structures 5 in the chip inductor is also along XX' direction. The dielectric structure between the two adjacent monolayer plane spiral coil structures 5 has a thickness equal to the thickness of the insulation layer 2 between the adjacent metal layers 3 along XX' direction of the chip inductor. As shown in FIG. 2, an axial direction of the monolayer plane spiral coil structures 5 in the chip inductor is also along YY' direction, the dielectric structure between the two adjacent monolayer plane spiral coil structures 5 has a thickness equal to a distance between two vertical monolayer plane spiral coil structures 5.

No matter whether the axial direction of the multilayer planar spiral coil structure of the chip inductor is perpendicular or parallel with the plane of the pin layer 1, the dielectric structure between the adjacent two monolayer plane spiral coil structures 5 has a thickness greater than the thickness of a single monolayer plane spiral coil structure 5. Compared with the chip inductor which has a same thickness and in which the thickness of monolayer plane spiral coil structures 5 along the axial direction of the chip inductor equal to the thickness of the dielectric structure, adjacent two monolayer plane spiral coil structures 5 have an increased distance, which addresses the problem in which a large coupling effect of the adjacent monolayer plane spiral coil structures 5 along the axial direction of the chip inductor due to the small distance between the adjacent monolayer plane spiral coil structures 5 affects the resonant frequency of the chip inductor, and improves the resonant frequency of the chip inductor. Exemplarily, the dielectric structure may be formed of a material including PI, that is, polyimide. In other words, the dielectric structure is formed of PI.

In an embodiment, the multilayer plane spiral coil structure includes monolayer plane spiral coil structures 5 along the axial direction of the multilayer plane spiral coil structure. Each monolayer plane spiral coil structure may form a coil structure with at least one turn. For example, the monolayer plane spiral coil structure 5 in uppermost metal layer 3 in FIG. 1 has a coil turn number greater than 1, so that a larger inductance of the chip inductor may be obtained within a same size, which is also advantageous for implementing miniaturization of the chip inductor. The chip inductor structure shown in FIG. 2 may also be arranged in a manner in which each of the monolayer plane spiral coil structures 5 has a multi-turn coil, and also obtain a larger inductance of the chip inductor within a same size, which is advantageous for implementing the miniaturization of the chip inductor. It should be noted that each of the monolayer plane spiral coil structures 5 of the chip inductor structure shown in FIG. 2 includes a multi-turn coil, compared with the monolayer plane spiral coil structures 5 with a single-turn coil shown in FIG. 2, the chip inductor has an increased number of processes. In an embodiment, each of the monolayer plane spiral coil structures 5 of the chip inductor shown in FIG. 1 includes a multi-turn coil.

In an embodiment, referring to FIGS. 1 and 2, each pin structure 10 of the chip inductor may include a pad structure 101 and metal structure 102 located on the pad structure 101. The two ends 4 of the multilayer plane spiral coil structure are electrically connected with respective metal structures 102. Exemplarily, the pad structure 101 may be formed of solder to facilitate soldering of the chip inductor on the printed circuit board, and the metal structure 102 in the pin structure 10 has a same kind of material with the patterned metal structures 31 in each metal layer 3. It should be noted that, the embodiments of the disclosure has no limitation for the material formed the patterned metal structure 31, a metal material or metal oxide material with a high conductivity may maximize the Q value of the chip inductor.

Figure 3:
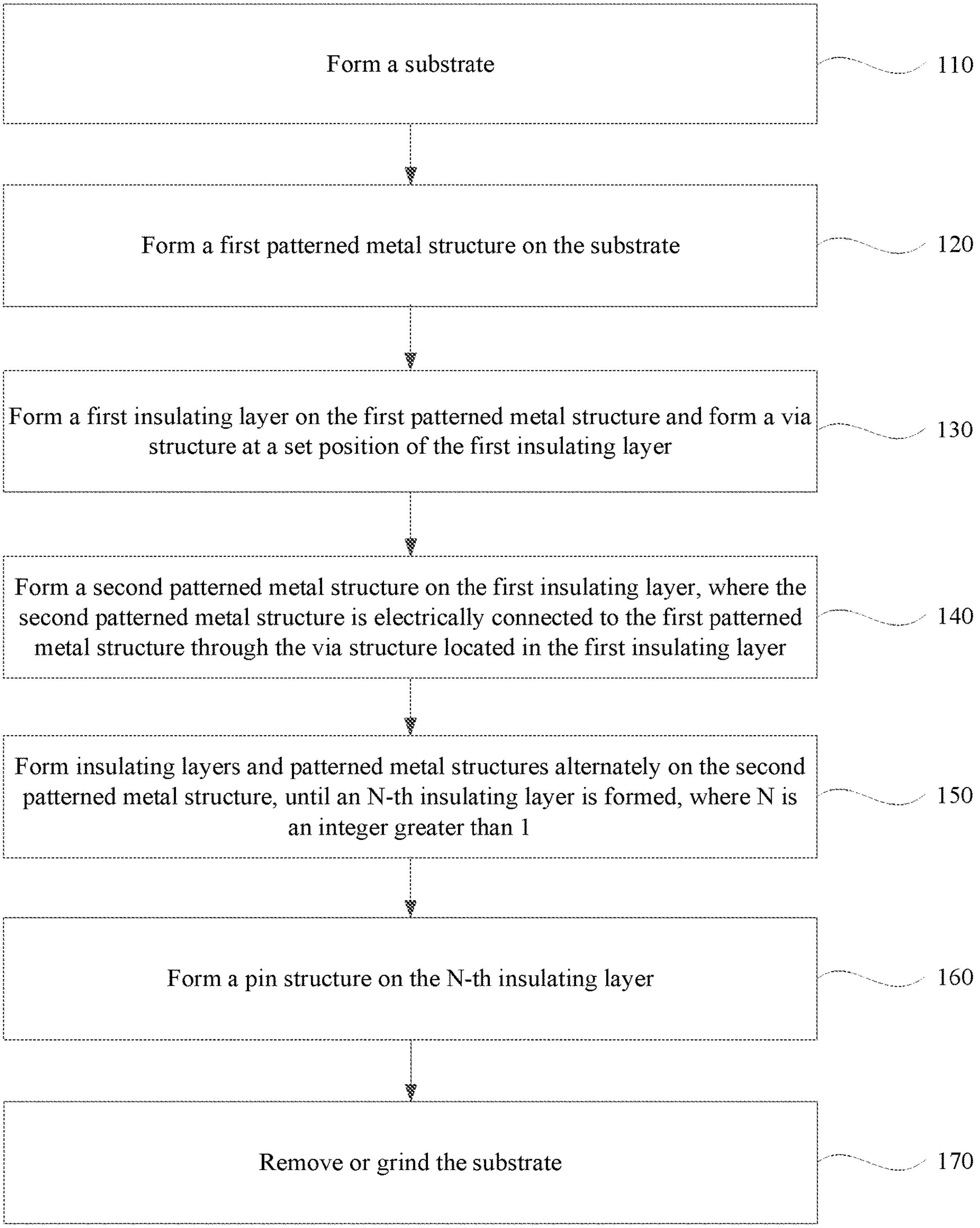
FIG. 3 is a flow chart of a manufacturing method of a chip inductor according to an embodiment of the present disclosure.

A manufacturing method of a chip inductor is also provided, which is used for manufacturing the chip inductor according to the above embodiments. FIG. 3 is a flow chart of a manufacturing method of a chip inductor according to an embodiment of the present disclosure. As shown in FIG. 3, the manufacturing method of a chip inductor includes steps described below.

In step 110, a substrate is formed.

The substrate may be a wafer with a size of 8 inches, 12 inches, 500 mm×500 mm or larger, and may have a shape of a circular, a square, a rectangular, etc. The substrate may be formed of at least one of the following materials: silicon, glass, quartz, ceramic or organic material.

In step 120, a first patterned metal structure is formed on the substrate.

Referring to FIG. 1, the first patterned metal structure 311 is formed on the substrate (the substrate is not shown in FIG. 1). The first patterned metal structure 311 may be formed using processes such as electroplating, sputtering, or depositing and etching a metal layer 3. Referring to FIG. 2, the first patterned metal structure 311 is formed on the substrate (the substrate is not shown in FIG. 2). The first patterned metal structure 311 may also be formed using processes such as electroplating, sputtering, or depositing and etching a metal layer 3. The first patterned metal structure 311 may be formed by the electroplating process, which may form a metal film layer with a relatively large thickness, so as to be beneficial to improving the Q value of the chip inductor.

In step 130, a first insulating layer is formed on the first patterned metal structure and a via structure is formed at a set position of the first insulating layer.

Referring to FIG. 1, the first insulating layer 21 is formed on the first patterned metal structure 311 and a via structure 20 is formed at the set position of the first insulating layer 21. In FIG. 1 only the via structure 20 of the first insulating layer 21 is shown, not the first insulating layer 21. Referring to FIG. 2, the first insulating layer 21 is formed on the first patterned metal structure 311 and the via structure 20 is formed at the set position of the first insulating layer 21.

Similarly, in FIG. 2 only the via structure 20 of the first insulating layer 21 is shown, while the first insulating layer 21 is not shown.

Exemplary, the first insulating layer 21 is formed of a material including PI, i.e. polyimide. An insulating layer 21 may be deposited first, and then the via structure 20 is formed at the set position of the first insulating layer 21 through a dry etching process or a laser etching process. According to the chip inductor shown in FIG. 2, because of a relatively large thickness of the first insulating layer 21, the via structure 20 of the first insulating layer 21 has an elongated shape. In an embodiment, the via structure 20 is formed at the set position of the first insulating layer 21 by the laser etching process.

In step 140, a second patterned metal structure is formed on the first insulating layer, where the second patterned metal structure is electrically connected to the first patterned metal structure through the via structure located in the first insulating layer.

Referring to FIGS. 1 and 2, the second patterned metal structure 312 is formed on the first insulating layer 21, the via structure 20 of the first insulating layer 21 is filled with a material formed the second patterned metal structure 312. The second patterned metal structure 312 is electrically connected to the first patterned metal structure 311 through the via structure 20 located in the first insulating layer 21. Similarly the second patterned metal structure 312 is formed through one of following processes: electroplating, sputtering, or depositing and etching a metal layer 3.

In step 150, insulating layers and patterned metal structures on the second patterned metal structure are alternately formed, until an N-th insulating layer is formed. N is an integer greater than 1. An M-th patterned metal structure is electrically connected with an (M−1)-th patterned metal structure through a via structure located in M−1-th insulating layer. M is an integer greater than 2 and less than or equal to N.

Referring to FIG. 1, second insulating layer 22 is formed, subsequently insulating layers 2 and patterned metal structures 31 are arranged alternately, until a fifth insulating layer 25 is formed. The fifth insulating layer 25 is located between the lowermost metal layer 3 and the pin structures 10 to realize electrical insulation of the part without an electrical connection between the lowermost metal layer 3 and the pin structures 10. Referring to FIG. 2, the second insulating layer 22 is formed, which is located between the lowermost metal layer 3 and the pin structures 10 to realize electrical insulation of the part without an electrical connection between the lowermost metal layer 3 and the pin structures 10.

In step 160, a pin structure is formed on the N-th insulating layer.

Referring to FIGS. 1 and 2, each pin structure 10 includes a pad structure 101 and metal structure102 located on the pad structure 101. The metal structure 102 of the pin structure 10 may be firstly formed on the lowermost insulating layer 2, then the pad structure 101 on the metal structure 102 is formed. The pad structure 101 on the pin structure 10 may have a same shape as the metal structure 102 on the pin structure 10, both of which may be patterned at the same time to simplify manufacturing process.

In step 170, the substrate is removed or ground.

After the pin structure 10 is formed, the substrate may be removed or ground, i.e. the substrate located above the first metal layer 31 may be peeled off or ground to form a complete chip inductor. After the substrate is removed or ground, the metal layers 3 and the insulating layers 2 may be cut to form a surface mount device with a standard size, such as 0201, 01005 or a smaller size.

Exemplary, referring to FIG. 2, a substrate, such as a silicon wafer, may be formed first, a via structure 20 is formed at the set position of the substrate using a through silicon via (TSV) process. That is to say, six elongated via structures 20 in FIG. 2 are formed. Then a first patterned metal structure 311 and second patterned metal structure 312 are respectively formed on the front and back surfaces of the substrate, on the front or back of the substrate insulating layers 2 and pin structures 10 are correspondingly formed. Different from above embodiments, the substrate formed by this method is enclosed inside the chip inductor. The substrate may also be made of other materials such as a dielectric material or glass using a corresponding process. The embodiments of this disclosure have no limitations for that.

The chip inductor according to the present disclosure includes a pin layer, insulating layers and metal layers alternately arranged on the pin layer. Multiple patterned metal structures arranged in the metal layers are respectively electrically connected to form a multilayer plane spiral coil structure. The multilayer plane spiral coil structure has two ends electrically connected with respective pin structures in the pin layer. The chip inductor may be manufactured by a semiconductor process according to above described embodiments, which is beneficial to accurately controlling size of the chip inductor, improving precision of the chip inductor, increasing conductivity of the chip inductor, reducing resistance of the chip inductor and improving Q value of the chip inductor. In addition, the insulating layers and metal layers are arranged alternately in the formed chip inductor, and the patterned metal structures in the metal layers form the multi-layer planar spiral coil structure, which is beneficial to obtaining a relatively large inductance within a small size, that is, to realizing miniaturization of the chip inductor.

What is claimed is:

1. A manufacturing method of a chip inductor, comprising:

forming a substrate;

forming a first patterned metal structure on the substrate;

forming a first insulating layer on the first patterned metal structure and a via structure at a set position of the first insulating layer;

forming a second patterned metal structure on the first insulating layer, wherein the second patterned metal structure is electrically connected to the first patterned metal structure through the via structure located in the first insulating layer;

alternately forming insulating layers and patterned metal structures on the second patterned metal structure, until an N-th insulating layer is formed; wherein N is an integer greater than 1, an M-th patterned metal structure is electrically connected with an (M−1)-th patterned metal structure through a via structure located in M−1-th insulating layer, wherein M is an integer greater than 2 and less than or equal to N;

forming a pin structure on the N-th insulating layer; and removing or grinding the substrate;

wherein M patterned metal structures are electrically connected to form a multilayer plane spiral coil structure, the multilayer plane spiral coil structure comprises a plurality of monolayer plane spiral coil structures along an axial direction of the multiplayer plane spiral coil structure, and a dielectric structure between two adjacent monolayer plane spiral coil structures of the plurality of monolayer plane spiral coil structures has a thickness greater than a thickness of each of the plurality of monolayer plane spiral coil structures.

2. The manufacturing method of a chip inductor according to claim 1, wherein each patterned metal structure of the M patterned metal structures is formed through one of an electroplating process, a sputtering process or an etching process.

3. The manufacturing method of a chip inductor according to claim 1, wherein each insulating layer of N insulating layers is formed of a material comprising polyimide (PI), and a via structure is formed at the set position of the M2-th insulating layer through one of a dry etching process or a laser etching process.

4. A chip inductor manufactured by a method comprising:

forming a substrate;

forming a first patterned metal structure on the substrate;

forming a first insulating layer on the first patterned metal structure and a via structure at a set position of the first insulating layer;

forming a second patterned metal structure on the first insulating layer, wherein the second patterned metal structure is electrically connected to the first patterned metal structure through the via structure located in the first insulating layer;

alternately forming insulating layers and patterned metal structures on the second patterned metal structure, until an N-th insulating layer is formed; wherein N is an integer greater than 1, an M-th patterned metal structure is electrically connected with an (M−1)-th patterned metal structure through a via structure located in M−1-th insulating layer, wherein M is an integer greater than 2 and less than or equal to N;

forming a pin structure on the N-th insulating layer; and removing or grinding the substrate;

wherein M patterned metal structures are electrically connected to form a multilayer plane spiral coil structure, the multilayer plane spiral coil structure comprises a plurality of monolayer plane spiral coil structures along an axial direction of the multiplayer plane spiral coil structure, and a dielectric structure between two adjacent monolayer plane spiral coil structures of the plurality of monolayer plane spiral coil structures has a thickness greater than a thickness of each of the plurality of monolayer plane spiral coil structures;

wherein the chip inductor comprises a pin layer, a plurality of insulating layers and a plurality of metal layers, wherein the plurality of insulating layers and the plurality of metal layers are arranged successively and alternately on the pin layer, wherein a plurality of patterned metal structures respectively arranged in the plurality of metal layers are electrically connected to form a multilayer plane spiral coil structure; wherein any two adjacent patterned metal structures of the plurality of patterned metal structures are electrically connected through a via structure in one insulating layer between the two adjacent patterned metal structures of the plurality of insulating layers; and wherein the multilayer plane spiral coil structure has two ends electrically connected with respective pin structures in the pin layer.

5. The chip inductor according to claim 4, wherein the multilayer plane spiral coil structure comprises a plurality of monolayer plane spiral coil structures along an axial direction of the multiplayer plane spiral coil structure, and a dielectric structure between two adjacent monolayer plane spiral coil structures of the plurality of monolayer plane spiral coil structures has a thickness greater than a thickness of each of the monolayer plane spiral coil.

6. The chip inductor according to claim 5, wherein the dielectric structure is formed of a material comprising polyimide (PI).

7. The chip inductor according to claim 4, wherein the multilayer plane spiral coil structure has an axial direction perpendicular to or parallel with a plane of the pin layer.

8. The chip inductor according to claim 4, wherein the multilayer plane spiral coil structure comprises a plurality of monolayer plane spiral coil structures along an axial direction of the multilayer plane spiral coil structure, and each of the plurality of monolayer plane spiral coil structures forms a coil structure with at least one turn.

9. The chip inductor according to claim 4, wherein each pin structure comprise a pad structure and metal structure located on the pad structure, and the two ends of the multilayer plane spiral coil structure are electrically connected with respective metal structures.

* * * * *